United States Patent [19]

Springer et al.

[11] Patent Number: 5,268,458
[45] Date of Patent: Dec. 7, 1993

[54] AZO COMPOUNDS, HAVING A 1-SULFO-6-CARBOXY-2-NAPHTHYL GROUP AS THE DIAZO COMPONENT AND A HALOGEN-SUBSTITUTED HETEROCYCLIC FIBER-REACTIVE GROUP

[75] Inventors: Hartmut Springer, Königstein/Taunus; Kurt Hussong, Bad Soden am Taunus, both of Fed. Rep. of Germany

[73] Assignee: Hoechst Aktiengesellschaft, Frankfurt am Main, Fed. Rep. of Germany

[21] Appl. No.: 862,584

[22] PCT Filed: Dec. 17, 1990

[86] PCT No.: PCT/EP90/02200

§ 371 Date: Jun. 25, 1992

§ 102(e) Date: Jun. 25, 1992

[87] PCT Pub. No.: WO91/09913

PCT Pub. Date: Jul. 11, 1991

[30] Foreign Application Priority Data

Dec. 29, 1989 [DE] Fed. Rep. of Germany ....... 3943286

[51] Int. Cl.$^5$ ............... C09B 62/026; C09B 62/08; C09B 62/24; D06P 1/382
[52] U.S. Cl. ................. 534/638; 534/632; 534/635; 534/637
[58] Field of Search ............... 534/632, 635, 637, 638

[56] References Cited

U.S. PATENT DOCUMENTS

| | | | |
|---|---|---|---|
| 2,951,070 | 8/1960 | Stephen et al. | 534/632 |
| 3,127,232 | 3/1964 | Price et al. | 534/637 X |
| 3,261,826 | 7/1966 | Andrew | 534/632 |
| 3,910,758 | 10/1975 | Bien et al. | 534/638 X |
| 4,122,079 | 10/1978 | Schundehutte | 534/638 |
| 4,578,457 | 3/1986 | Seiler | 534/632 |
| 4,988,803 | 1/1991 | Stohr et al. | 534/635 |

FOREIGN PATENT DOCUMENTS

| | | | |
|---|---|---|---|
| 638567 | 3/1962 | Canada | 534/632 |
| 0073178 | 3/1983 | European Pat. Off. . | |
| 168739 | 1/1986 | European Pat. Off. | 534/637 |
| 0324373 | 7/1989 | European Pat. Off. . | |
| 1135592 | 8/1962 | Fed. Rep. of Germany . | |
| 3010161 | 9/1981 | Fed. Rep. of Germany | 534/637 |
| 62-20563 | 1/1987 | Japan | 534/637 |
| 0510728 | 9/1971 | Switzerland . | |
| 829042 | 2/1960 | United Kingdom | 534/632 |
| 1165661 | 10/1969 | United Kingdom . | |
| 1169254 | 11/1969 | United Kingdom . | |
| 2003911 | 3/1979 | United Kingdom . | |
| 2057479 | 4/1981 | United Kingdom . | |
| 2103232 | 2/1983 | United Kingdom . | |

*Primary Examiner*—Mary C. Lee
*Assistant Examiner*—Fiona T. Powers

[57] ABSTRACT

Azo compounds containing, as the diazo constituent, 1-sulpho-6-carboxy-2-aminonaphthalene and, as the coupling constituent, substances which contain a residue of the pyrimidine or triazine series which reacts with fibers. The azo compounds possess dye properties and, when used in the usual application fixing process for fiber-reactive dyes, color materials containing carbonamide and/or hydroxyl groups, in particular fibrous material such as wool, synthetic nylon and, in particular, cellulose fiber materials in intense, permanent shades.

8 Claims, No Drawings

AZO COMPOUNDS, HAVING A 1-SULFO-6-CARBOXY-2-NAPHTHYL GROUP AS THE DIAZO COMPONENT AND A HALOGEN-SUBSTITUTED HETEROCYCLIC FIBER-REACTIVE GROUP

DESCRIPTION

The present invention relates to the technical field of fiber-reactive azo dyes.

Large numbers of fiber-reactive azo dyes which have a di- or trisulfonaphthylamine as the diazo component and a fiber-reactive radical from the heterocyclic series are known, for example, from U.S. Pat. Nos. 2,951,070, 3,216,826 and 4,122,079, German Auslegeschrift 1,135,592, British Patents 1,165,661 and 1,169,254, and British Patent Application PublicationNo. 2,057,479A. The rising demands on the quality, economy and brilliance of the dyeings have made necessary the development of novel azo dyes whose properties in this respect are improved and which, in addition, have simple technical properties in use.

With the present invention, novel azo compounds have now been found which correspond to the formula (1)

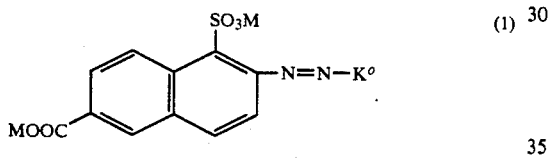

In this formula:

M is a hydrogen atom or a salt-forming metal atom such as, in particular, an alkali metal atom such as sodium, potassium or lithium;

K° is a radical of the formula (2A) or (2B)

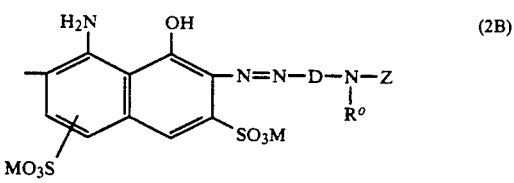

in which

M has the abovementioned meaning,

R° is hydrogen or alkyl having 1 to 4 carbon atoms such as methyl or ethyl, or is alkyl which has 1 to 4 carbon atoms such as, for example, ethyl and which is substituted by sulfo, carboxyl, sulfato, phosphato, hydroxyl, methoxy, ethoxy, phenyl, monosulfophenyl or disulfophenyl, and is preferably hydrogen, Z is a fiber-reactive radical from the pyrimidine or triazine series which contains an alkali-detachable substituent, D is a radical of the formula (3)

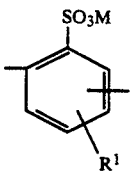

in which

M has one of the abovementioned meanings and $R^1$ is hydrogen or alkyl having 1 to 4 carbon atoms such as ethyl and, in particular, methyl, E is a radical of the formula (4a), (4b), (4c) or (4d)

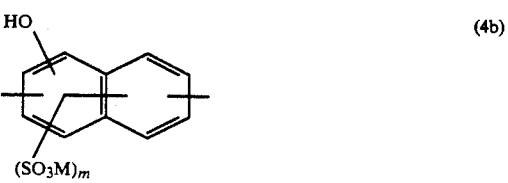

in which

R is hydrogen, alkyl having 1 to 4 carbon atoms such as methyl, cyano, carboxyl, carbalkoxy having 2 to 5 carbon atoms such as carbomethoxy and carboethoxy, carbamoyl or phenyl, preferably methyl, carboxyl, cyano, carbomethoxy or carboethoxy, Q is a benzene or naphthalene radical, $R^2$ is hydrogen, alkyl having 1 to 4 carbon atoms such as ethyl and, in particular, methyl, alkoxy having 1 to 4 carbon atoms such as ethoxy and, in particular, methoxy, fluorine, bromine, chlorine, sulfo, carboxyl, carbalkoxy having 2 to 5 carbon atoms such as carbomethoxy and carboethoxy, trifluoromethyl, carbamoyl or N-($C_1$-$C_4$-alkyl)-carbamoyl, preferably hydrogen, methoxy, ethoxy, methyl or chlorine, if Q is a benzene ring, or $R^2$ is hydrogen or sulfo, if Q is a naphthalene ring, $R^3$ is hydrogen, alkyl having 1 to 4 carbon atoms such as ethyl and, in particular, methyl, or alkoxy having 1 to 4 carbon atoms such as ethoxy and, in particular, methoxy, or chlorine or sulfo, preferably hydrogen, methoxy, ethoxy or methyl, if Q is a benzene radical, or is hydrogen or sulfo, if Q is a naphthalene radical, $R^4$ is hydrogen, alkyl having 1 to 4 carbon atoms such as ethyl and, in particular, methyl, or alkoxy having 1 to 4 carbon atoms such as ethoxy and, in particular, methoxy, or bromine, chlorine, trifluoromethyl, sulfo, carboxyl or cyano, preferably hydrogen, methyl, methoxy or sulfo, $R^5$ is hydrogen, alkyl having 1 to 4 carbon atoms such as ethyl and, in particular, methyl, or alkoxy having 1 to 4 carbon atoms such as ethoxy and, in particular, methoxy, or chlorine, amino, alkylamino having 1 to 4 carbon atoms such as ethylamino, alkanoylamino having 2 to 5 carbon atoms such as acetylamino and propionylamino, or benzoylamino, ureido, N'-phenylureido, N'-($C_1$-$C_4$-alkyl)ureido, phenylsulfonyl or alkylsulfonyl having 1 to 4 carbon atoms such as ethylsulfonyl and methylsulfonyl, and preferably acetylamino, methyl, ureido or hydrogen, $R^6$ is hydrogen or sulfo, M has one of the abovementioned meanings, m is the number 1 or 2, v is the number zero or 1 and $—K—N(R°)—$ is the bivalent radical of a water-soluble coupling component such as, for example, a radical of the formula (5a), (5b), (5c), (5d), (5e), (5f), (5g), (5h) or (5i)

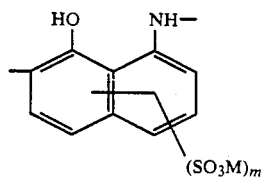
(5a)

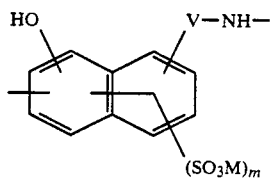
(5b)

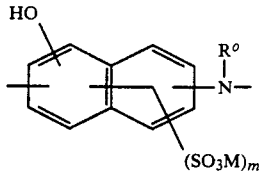
(5c)

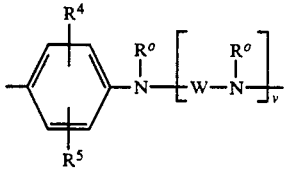
(5d)

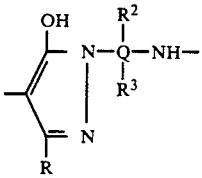
(5e)

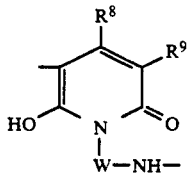
(5f)

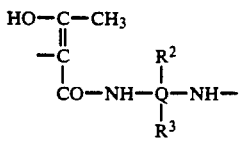
(5g)

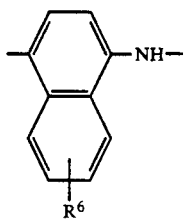
(5h)

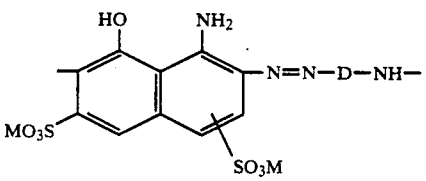
(5i)

in which

M, m, Q, D, R, R°, $R^1$, $R^2$, $R^3$, $R^4$, $R^5$, $R^6$ and v have one of the abovementioned meanings, V is a direct, covalent bond or a radical of the formula —NH—CO—phenylene, —NH—CO—NH—phenylene, —N($CH_3$)—CO—phenylene, —N($CH_3$)—CO—NH—phenylene or —NH—phenylene, W is a phenylene radical which can be substituted by 1 or 2 substituents selected from the group consisting of alkyl having 1 to 4 carbon atoms such as ethyl and, in particular, methyl, or by alkoxy having 1 to 4 carbon atoms such as ethoxy and, in particular, methoxy, chlorine, carboxyl and sulfo, or is an alkylene having 1 to 6 carbon atoms, preferably 1 to 4 carbon atoms, such as, for example, ethylene, or is an alkylenephenylene with an alkylene having 2 to 4 carbon atoms such as, for example, the methylenephenylene or ethylenephenylene radical, $R^8$ is hydrogen, alkyl having 1 to 4 carbon atoms such as methyl, alkoxy having 1 to 4 carbon atoms such as methoxy, phenyl, or alkyl which has 1 to 4 carbon atoms and is substituted by cyano, and $R^9$ is hydrogen, sulfo, sulfoalkyl having 1 to 4 carbon atoms such as sulfomethyl, cyano or carbamoyl.

The symbol E is to be understood as meaning the radical of a compound, corresponding to the formula H—E—$NH_2$, which can undergo coupling and can be diazotized.

In each of the formulae (4b), (5b) and (5c), the hydroxyl group and the free bond in the same aromatic ring are in the ortho-position relative to each other. The hydroxyl group is preferably bonded to the naphthalene radical in the α-position.

The groups termed above or below as "sulfo", "carboxyl", "phosphato" and "sulfato" include their acid form as well as their salt form. Accordingly, sulfo groups are groups which correspond to the formula —SO$_3$M, carboxyl groups are groups which correspond to the formula —COOM, phosphato groups are groups which correspond to the formula —OPO$_3$M$_2$, and sulfato groups correspond to groups of the formula —O-SO$_3$M, M in each case having the abovementioned meaning.

Examples of fiber-reactive pyrimidine radicals Z which contain at least one alkali-detachable substituent which is preferably a chlorine and, in particular, a fluorine atom, are the 2-fluoro-4-pyrimidinyl, 6-fluoro-2,5-dichloro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methyl-sulfonyl-4-pyrimidinyl, 2-fluoro-4-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 6-fluoro-5-chloro-4-pyrimidinyl, 6-fluoro-5-trifluoromethyl-4-pyrimidinyl, 6-fluoro-2-methyl-4-pyrimidinyl, 6-fluoro-5-chloro-2-methyl-4-pyrimidinyl, 5,6-difluoropyrimidinyl, 6-fluoro-5-chloro-2-trifluoromethyl-4-pyrimidinyl, 6-fluoro-2-phenyl-4-pyrimidinyl, 6-fluoro-5-cyano-4-pyrimidinyl, 6-fluoro-5-nitro-4-pyrimidinyl, 6-fluoro-5-methylsulfonyl-4-pyrimidinyl and 6-fluoro-5-phenylsulfonyl-4-pyrimidinyl radical.

Preferred amongst these are the 2,6-difluoro-5-chloropyrimidin-4-yl, the 2-fluoro-5,6-dichloropyrimidin-4-yl and the 2,5-dichloro-6-fluoropyrimidin-4-yl radical.

Fiber-reactive radicals Z from the triazine series are, in particular, the 2,4-dichloro-1,3,5-triazin-6-yl radical as well as radicals which the formula (6)

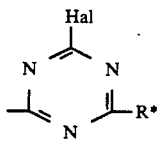

(6)

in which
Hal is a halogen atom, preferably a chlorine or fluorine atom, and
R* is an alkoxy group having 1 to 4 carbon atoms such as the methoxy or ethoxy group, or a phenoxy group which can be substituted by 1 or 2 substituents selected from the group comprising methyl, ethyl, methoxy, ethoxy, chlorine, sulfo and carboxyl, or, preferably, an amino group of the formula (7)

(7)

$R^7$ is hydrogen or alkyl having 1 to 4 carbon atoms such as methyl or ethyl, or alkyl which has 1 to 4 carbon atoms such as, for example, ethyl and which is substituted by sulfo, carboxyl, sulfato, phosphato, hydroxyl, methoxy, ethoxy, phenyl, monosulfophenyl or disulfophenyl, $R^{10}$ is hydrogen, alkyl having 1 to 4 carbon atoms such as methyl or ethyl, or alkyl which has 1 to 4 carbon atoms such as, for example, ethyl and which is substituted by sulfo, carboxyl, sulfato, phosphato, hydroxyl, methoxy, ethoxy, phenyl, monosulfophenyl or disulfophenyl, or is a cycloalkylene having 5 or 6 carbon atoms which can be substituted by 1, 2 or 3 methyl groups, or is a phenyl radical which can be substituted by 1 or 2 substituents selected from the group comprising methyl, ethyl, methoxy, ethoxy, chlorine, sulfo or carboxyl, or $R^7$ and $R^{10}$ together with the N atom form a 5- or 6-membered heterocyclic radical which can contain one or two further hetero atoms and/or hetero groups such as an oxygen, sulfur or nitrogen atom or an —NH— group, such as, for example, the piperidino, piperazino or morpholino radical.

R* is preferably an amino group of the formula (7) in which $R^7$ is hydrogen, methyl or ethyl and $R^{10}$ is a phenyl radical which is substituted by 1 or 2 sulfo groups.

Preferred azo compounds of the formula (1) where the radical K° equals the formula (2A) are, in particular, those in which the radical K° is a radical of the formula (9a), (9b), (9c), (9d), (9e) or (9)

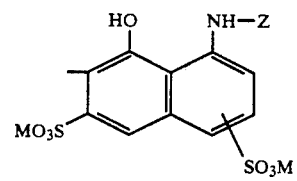

(9a)

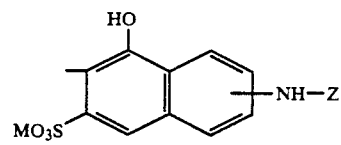

(9b)

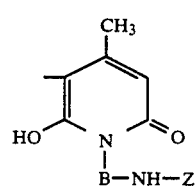

(9c)

-continued

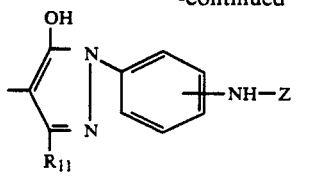

(9d)

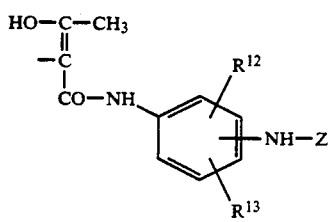

(9e)

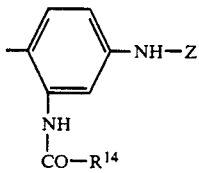

(9f)

in which

M and Z has one of the abovementioned meanings, in particular one of the preferred meanings, B is alkylene having 2 to 4 carbon atoms or phenylene, $R^{11}$ is carboxyl, methyl or carboethoxy, $R^{12}$ is hydrogen, methyl, methoxy, sulfo or chlorine, $R^{13}$ is hydrogen, methyl or methoxy and $R^{14}$ is methyl or amino.

The present invention furthermore relates to processes for the preparation of azo compounds of the formula (1) according to the invention, which comprise coupling, in the event that K° is a radical of the formula (2A), the diazonium compound of an amine of the formula (10)

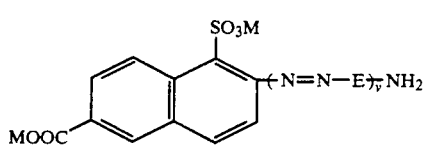

(10)

in which M, E and v have the abovementioned meanings, with a compound of the formula H—K—N(R°)—Z where K, R° and Z have the abovementioned meaning, or reacting a compound of the formula (11)

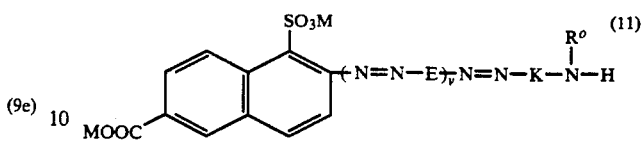

(11)

in which M, E, v, R° and K have the abovementioned meanings, with a compound of the formula Hal-Z where Hal and Z have the abovementioned meaning, or, to prepare a compound (1) which has a fiber-reactive radical of the formula (6) as the radical Z, reacting a compound of the formula (12)

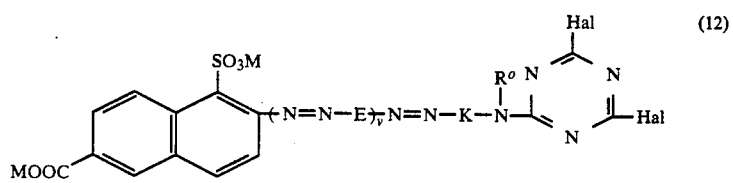

(12)

in which M, E, v, R° and K have one of the abovementioned meanings and Hal is as defined above, preferably both Hal are chlorine, with a compound of the formula H-R* where R* has the abovementioned meaning in equivalent amounts, and, in the event that K° is a radical of the formula (2B), coupling a compound of the formula (13)

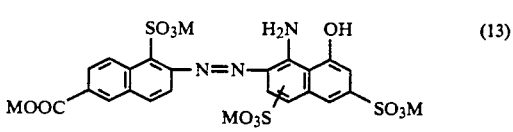

(13)

in which M has the abovementioned meaning, with the diazonium compound of an amine of the formula (14)

 (14)

in which D, R° and Z have the abovementioned meaning, or reacting a compound of the formula (15)

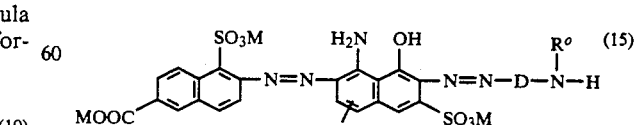

(15)

in which D, R° and M have the abovementioned meanings, with a compound of the formula Hal-Z where Hal and Z have the abovementioned meaning, or reacting a compound of the formula (16)

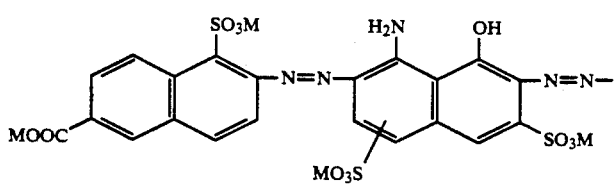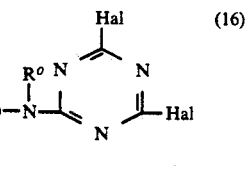

(16)

in which D, R° and M have the abovementioned meanings and Hal is as defined above, both Hal are preferably chlorine, with a compound of the formula H-R* where R* has the abovementioned meaning in equivalent amounts.

The diazotization and coupling reactions of the process according to the invention are carried out in a customary and well-known manner, the diazotization, for example, generally at a temperature between −5° C. and +15° C. and a pH of below 2, by means of a strong acid and an alkali metal nitrite, in a preferably aqueous medium, and the coupling reaction generally at a temperature between 0° and 30° C. and a pH of between 1 and 4.5 in the case of an amino-containing coupling component and at a pH of between 3 and 7.5 in the case of a hydroxyl-containing coupling component, and at a temperature between 0° and 30° C. in a preferably aqueous medium.

The starting compounds of formula (10) where v is 1 are prepared starting from 1-sulfo-6-carboxy-2-aminonaphthalene as the diazo component and the compound of the formula H—E—NH₂ as the coupling component, in the known manner of diazotization and coupling reactions. The azo compounds of the formula (13) are synthesized in the same manner by coupling the diazonium salt of 1-sulfo-6-carboxy-2-aminonaphthalene with 1-amino-8-naphthol-3,6- or -4,6-disulfonic acid analogously to known procedures, in a highly acid medium.

The starting compounds corresponding to the formula H₂N—D—N(R°)H, the formula H—K—N(R°)H, the formula H—E—NH₂ and the formula H—R* are known and described in large numbers in the literature.

Examples of starting compounds of the formula H—E—NH₂ are aniline, 3-methylaniline, 3-chloroaniline, 2,5-dimethylaniline, 2,5-dimethoxyaniline, 3-methoxyaniline, 3-methyl-6-methoxyaniline, 3-ureidoaniline, 3-acetylamino-6-methylaniline, 2-amino-4-acetylaminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylaminoaniline, 2,3-dimethylaniline, 3,5-dimethylaniline, 2-methoxy-5-acetylaminoaniline, 2-chloro-6-methylaniline, 5-chloro-2-methylaniline, 2,6-dichloro-3-methylaniline and 2-methoxy-5-methylaniline.

Examples of coupling components which correspond to the formula H—K—N(R°)—Z are 1-(4',6'-dichloro-1',3',5'-triazin-2'-yl)-amino-8-naphthol-4,6-or -3,6-disulfonic acid, 2-or 3-(4',6'-dichloro-s-triazin-2'-yl)-amino-8-naphthol-6-sulfonic acid, 1-(2',4'-difluoro-5-chloropyrimidin-6'-yl)-amino-8-naphthol-3,6-or -4,6-disulfonic acid, 2- or 3-(2',4'-difluoro-5'-chloropyrimidin-6'-yl)-amino-8-naphthol-6-sulfonic acid, 1-(2'-fluoro-4',5'-dichloropyrimidin-6'-yl)-amino-8-naphthol-3,6-or -4,6-disulfonic acid, 2- or 3-(2'-fluoro-4',5'-dichloropyrimidin-6'-yl)-amino-8-naphthol-6-sulfonic acid, 1-(2',5'-dichloro-5'-fluoropyrimidin-6'-yl)-amino-8-naphthol-3,6-or -4,6-disulfonic acid, 2- or 3-(2',5'-dichloro-5'-fluoropyrimidin-6'-yl)-amino-8-naphthol-6-sulfonic acid, 1-[2'-fluoro-4'-(4''-sulfophenylamino)-s-triazin-6'-yl]-amino-8-naphthol-6-sulfonic acid, 1-[2'-fluoro-4'-(β-sulfoethylamino)-s-triazin-6'-yl]-amino-8-naphthol-6-sulfonic acid, 2-[2'-sulfo-5'- (4'',6''-dichloro-s-triazin-2''-yl)-aminophenylazo]-1-amino-8-naphthol-3,6-disulfonic acid, 2-[2'-sulfo-4'-(4'',6''-dichloro-s-triazin-2''-yl)-aminophenylazo]-1-amino-8-naphthol-3,6-disulfonic acid, 2-[2'-sulfo-5'-(2'',5''-dichloro-4''-fluoropyrimidin-6''-yl)-aminophenylazo]-1-amino-8-naphthol-3,6-disulfonic acid, 2-[2'-sulfo-5'-(2''-fluoro-4'',5''-dichloropyrimidin-6''-yl)-aminophenylazo]-1-amino-8-naphthol-3,6-disulfonic acid, 2-[2'-sulfo-5'-(2'',4''-difluoro-5''-chloropyrimidin-6''-yl)-aminophenylazo]-1-amino-8-naphthol-3,6-disulfonic acid, 1-[4'-(4'',6''-dichloro-s-triazin-2''-yl)-amino]-phenyl-3-methyl or -3-carboxy-5-pyrazolone, 1-[4'-(2'',5''-dichloro-4''-fluoropyrimidin-6''-yl)-amino]-phenyl-3-methyl-or -3-carboxy-5-pyrazolone, 1-[4'-(2''-fluoro-4'',5''-dichloropyrimidin-6''-yl)-amino]-phenyl-3-methyl-or -3-carboxy-5-pyrazolone, 1-[4'-(2'',4''-difluoro-5''-chloropyrimidin-6''-yl)-amino]-phenyl-3-methyl-or-3-carboxy-5-pyrazolone and 4-methyl-1-[β-(4',6'-dichloro-s-triazin-2'-yl)-amino-ethyl]-6-hydroxy-2-pyridone.

Examples of starting compounds of the formula H—K—N(R°)H are 1-(3'- or 4',-aminophenyl)-3-carboxy-5-pyrazolone, 1-(2'-sulfo-5'-aminophenyl)-3-carboxy-5-pyrazolone, 1-(2'-methoxy-5'-aminophenyl)-3-carboxy-5-pyrazolone, 1-(3'- or 4'-aminophenyl)-3-methyl-5-pyrazolone, 1-(6'-amino-4',8'-disulfonaphth-2'-yl)-3-carboxy-5-pyrazolone, 1-amino-3,6-or -4,6-disulfo-8-naphthol, 7-amino-3-sulfo-1-naphthol, 6-amino-3-sulfo-1-naphthol, 6-amino-3,5-disulfo-1-naphthol, 3-methylaniline, 3-chloroaniline, 2,5-dimethylaniline, 2,5-dimethoxyaniline, aniline, 3-methoxyaniline, 3-methyl-6-methoxyaniline, 3-ureidoaniline, 3-acetylamino-6-methylaniline, 2-amino-4-acetylaminobenzene-1-sulfonic acid, 1-aminonaphthalene, 1-aminonaphthalene-6-or -7- or -8-sulfonic acid, 3-acetylaminoaniline, 2-methylaniline, 2-methoxyaniline, 3-benzoylaminoaniline, 2,3-dimethylaniline, 3,5-dimethylaniline, 2-methoxy-5-acetylaminoaniline, 2-chloro-6-methylaniline, 5-chloro-2-methylaniline, 2,6-dichloro-3-methylaniline and 2-methoxy-5-methylaniline.

The condensation reactions between an amino starting compound of the formula (11) or (15) and a compound of the formula Hal-Z are carried out in a customary manner, by reacting an amino compound with a heterocyclic radical which contains a reactive halogen atom such as, in the present case, a halogen-substituted pyrimidine or triazine, in an aqueous-organic medium, preferably in an aqueous medium, and preferably in the presence of a dispersant with the addition of an acid-binding agent such as an alkali metal carbonate, alkaline earth metal carbonate, alkali metal hydrogen carbonate, alkali metal hydroxide, alkaline earth metal hydrogen carbonate, alkaline earth metal hydroxide or alkali metal acetate, the alkali and alkaline earth metals being preferably sodium, potassium or calcium or a tertiary amine such as, for example, pyridine, triethylamine or quinoline. If these condensation reactions take place in an organic or aqueous-organic medium, the (proportional) organic solvent is acetone, dioxane or dimethylformamide.

The condensation reactions between these amino compounds and the compound Hal-Z are generally carried out at a temperature of between −10° C. and +20° C., preferably between 0° and 10° C., and at a pH of between 2 and 7, preferably between 2 and 4. The reaction with a compound Hal-Z where Hal is a fluorine atom is particularly preferably carried out at a pH of between 2 and 3 and a temperature of between −5° C. and +5° C. The reaction with Hal-Z where Hal is a chlorine atom, as in particular the reaction of cyanuric chloride or a compound of the formula (17)

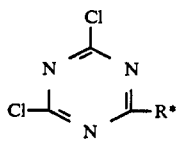

(6)

where R* has the abovementioned meaning, is particularly preferably carried out at a pH of between 4 and 6 and a temperature of between 10° and 40° C.

The condensation reaction between a dihalogenotriazinylamino compound corresponds to formula (12) or (16) and a hydroxy or amino compound which corresponds to the formula H-R* where R* has the abovementioned meaning is also carried out analogously to known procedures of such dihalogenotriazinylamino compounds with hydroxyalkanes, phenols and amines, for example also in the abovementioned reaction media using an acid-binder. The reaction is generally carried out at a temperature of between 10° and 60° C., preferably between 20° and 40° C., the reaction with starting compounds in which Hal is a chlorine atom particularly preferably being carried out at a temperature of between 30° and 40° C. and a pH of between 4.0 and 6.5.

1-Sulfo-6-carboxy-2-aminonaphthalene, which is used as the starting compound, was hitherto unknown. However, it can be prepared according to the invention by sulfonating 2-naphthol-6-carboxylic acid in a sulfuric acid/sulfur trioxide mixture (oleum) which has a sulfur trioxide content of from 0 to 65% by weight, at a temperature of between −5° C. and +40° C., preferably at 0° to 10° C., to first give 1-sulfo-6-carboxy-2-naphthol, then isolating this compound and subsequently reacting it with ammonium hydrogen sulfite in an aqueous, alkaline medium in an autoclave at a temperature of between 100° and 200° C., preferably between 140° and 160° C.

1-Sulfo-6-carboxy-2-naphthol is isolated from the reaction mixture in a customary manner by carefully pouring the reaction batch onto ice. The product which has precipitated is filtered off with suction and suspended in ice-water, and any sulfuric acid which may still be present is neutralized by means of sodium carbonate by adjusting the suspension to a pH of between 4 and 4.5. The compound can then be isolated by filtration with suction and drying.

The hydroxyl group is exchanged for the amino group analogously to the Bucherer reaction. For this purpose, a procedure is generally followed in which 1-sulfo-6-carboxy-2-naphthol is dissolved in an aqueous 20 to 30% by weight ammonium hydrogen sulfite solution, and the reaction mixture is reacted in an autoclave under the conditions given above. When this reaction is complete, the batch is adjusted to pH 1 using hydrochloric acid, at room temperature. Stirring of the mixture is continued for about 1 hour, during which process the sulfocarboxyaminonaphthalene compound according to the invention precipitates as an internal salt and can be isolated.

The compounds of the formula (1) according to the invention—termed compounds (1) in the following text—have fiber-reactive properties and very valuable dye properties. They can therefore be used for the dyeing (including printing) of hydroxyl-containing and/or carboxamido-containing materials. For this purpose of dyeing, the solutions obtained in the synthesis of the compounds (1) can be used directly as a liquid preparation, if appropriate after a buffer substance has been added an if appropriate after concentration.

The compounds (1) can be separated and isolated from the aqueous synthesis solutions by methods which are generally known for water-soluble compounds, for example by precipitation from the reaction medium by means of an electrolyte such as, for example, sodium chloride or potassium chloride, or, alternatively, by evaporating the reaction solution itself, for example by spray-drying.

If the last-mentioned method of isolation is chosen, it is often advisable to remove any amounts of sulfate which may be present in the solutions prior to evaporation, by precipitation as calcium sulfate and removing the precipitate by filtration.

The present invention therefore also relates to the use of the compounds (1) for dyeing (including printing) hydroxyl- and/or carboxamido-containing materials, or to processes for their use on these substrates. The materials are preferably used in the form of fiber materials, in particular in the form of textile fibers such as yarns, packages and fabrics. In this context, known procedures can be followed analogously.

Hydroxyl-containing materials are those of natural or synthetic origin such as, for example, cellulose fiber materials or regeneration products thereof and polyvinyl alcohols. Preferred cellulose fiber materials are cotton, but also other vegetable fibers such as linen, hemp, jute and ramie fibers; examples of regenerated cellulose fibers are staple viscose and filament viscose.

Examples of carboxamido-containing materials are synthetic and natural polyamides and polyurethanes, in particular in the form of fibers, for example wool and other animal hairs, silk, leather, nylon-6,6, nylon-6, nylon-11 and nylon-4.

According to the use according to the invention, the compounds (1) can be applied to and fixed on the abovementioned substrates, in particular on the abovementioned fiber materials, following application techniques known for water-soluble, fiber-reactive dyes, for example by applying the compound (1) to the substrate in dissolved form, or incorporating it in the substrate, and fixing it on, or in, the substrate, using heat or using an agent with an alkaline reaction, or using both measures. Such dyeing and fixing processes are described in the literature in large numbers (for example in European Patent Application Publication No. 0,181,585 A2). The compounds (1) are distinguished by high degrees of exhaustion and of fixation. They give, in particular in the exhaustion processes, deep dyeings at a high degree of fixation, even in wide temperature ranges (40° to 80° C.).

In particular on cellulose fiber materials, the dyeings according to the invention have good light fastness properties both in the dry dyed state and in the wet state, for example moistened with a perspiration solution, and good wet fastness properties such as, for example, good washing fastness properties at 60° to 95° C., even in the presence of perborates, and acid and alkaline milling fastness properties, cross-dyeing fastness properties and perspiration fastness properties, good acid and alkaline perspiration fastness properties, a high steam resistance, good acid fastness properties, water fastness properties and sea-water fastness properties, furthermore a good pleating fastness property, hotpress fastness property and crock fastness property. They also have a good acid-fading resistance when moist, dyed material which still contains acetic acid is stored.

The examples below are intended to illustrate the invention. The parts and percentages are by weight, unless otherwise specified. Parts by weight relate to parts by volume as kilograms relate to liters.

The compounds described in these examples by way of their formulae are given in the form of the free acids; in general, they are prepared in the form of their alkali metal salts, such as lithium, sodium or potassium salts, and isolated and used for dyeing in the form of their salts.

sulfite solution are stirred for about 8 hours in an autoclave at 150° C. under a pressure of 12 bar. The reaction mixture is then allowed to cool, and a pH of 1 is established at room temperature using hydrochloric acid. Stirring is continued for one hour, and the compound according to the invention which has precipitated as an internal salt is then isolated in a yield of about 70% of theory.

The constitution of 1-sulfo-6-carboxy-2-aminonaphthalene, according to the invention, is confirmed by $^1$H- and $^{13}$C-NMR spectroscopy and by the elemental analysis.

EXAMPLE 1

The starting compound 1-sulfo-6-carboxy-2-aminonaphthalene is diazotized in accordance with a customary diazotization reaction and reacted by coupling reaction with the equivalent amount of 3,6-disulfo-1-amino-8-naphthol at a highly acidic pH.

59.8 parts of this azo compound are coupled at a pH of between 5 and 6 with the conventionally prepared diazonium compound of 33.7 parts of the amino compound which can be obtained as a condensation product from equivalent amounts of 1,3-diaminobenzene-6-sulfonic acid and 2,4,6-trifluoro-5-chloropyrimidine. The resulting disazo compound according to the invention is isolated in a customary manner by salting out. Written in the form of the free acid, it has the formula

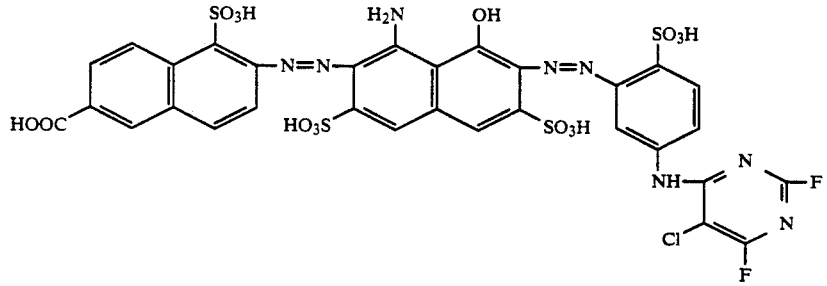

Likewise, the starting compounds and components which are mentioned in the examples which follow, in particular the tabulated examples, in the form of the free acid, can be used in synthesis as such or in the form of their salts, preferably alkali metal salts. The absorption maxima ($\lambda_{max}$) in the visible range which are indicated for the compounds according to the invention were determined on their alkali metal salts in aqueous solution.

EXAMPLE A a) 283.6 parts of 2-naphthol-6-carboxylic acid are introduced at 5° to 7° C. in 1200 parts of 100% sulfuric acid, with stirring and cooling. Stirring is then continued for about 2 hours at 10° C. and after this for about 2 hours at 20° C. until starting compound is no longer present (HPLC analysis). The reaction mixture is then stirred onto 2700 parts of ice. This results in the formation of a precipitate which is filtered off with suction and subsequently suspended in ice-water. The suspension is brought to a pH of between 4 and 4.5 using sodium carbonate, the product is filtered off with suction, washed with 10% aqueous sodium chloride solution, and dried under reduced pressure at 40° C.

b) 269.2 parts of 1-sulfo-6-carboxy-2-naphthol and 720 parts of an aqueous, 25% ammonium hydrogen which has very good fiber-reactive dye properties and, when application and fixing processes are used which are customary in fiber-reactive dye technology, dyes the materials mentioned in the description, such as, in particular, cotton, in strong, fast, reddish navy to black hues.

EXAMPLES 2 TO 9

Further disazo compounds according to the invention which correspond to the formula (A)

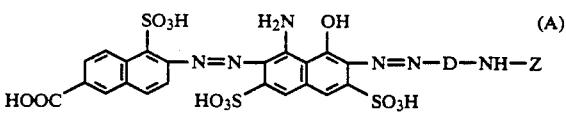

are described in the tabulated examples below with the aid of components D and Z. They can be prepared according to the invention, for example analogously to Exemplary Embodiment 1, by using the starting components which can be seen from the particular example. They likewise have very good fiber-reactive dye properties and, when the application and fixing processes which are customary for fiber-reactive dyes are used, give strong, fast dyeings and prints on the materials mentioned in the description such as, in particular, cellulose fiber materials such as cotton, in the hue given in the particular tabulated example (in this case cotton).

The alternative forms (a) and (b) of the radical D are radicals of the formulae below:

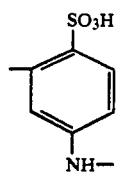 (a)

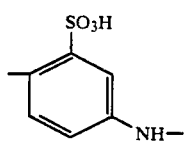 (b)

Disazo compound of the formula (A)

| Example | Radical D | Radical Z | Hue |
|---|---|---|---|
| 2 | formula (a) | 4,6-dichloro-s-triazin-2-yl | navy |
| 3 | formula (b) | 4,6-dichloro-s-triazin-2-yl | navy |
| 4 | formula (a) | 2,5-dichloro-4-pyrimidin-6-yl | navy |
| 5 | formula (b) | 2,5-dichloro-4-pyrimidin-6-yl | navy |
| 6 | formula (a) | 2-fluoro-4,5-dichloro-pyrimidin-6-yl | navy |
| 7 | formula (b) | 2-fluoro-4,5-dichloro-pyrimidin-6-yl | navy |
| 8 | formula (a) | 2,4-difluoro-5-chloro-pyrimidin-6-yl | navy |
| 9 | formula (b) | 2,4-difluoro-5-chloro-pyrimidin-6-yl | navy |

EXAMPLE 10

27 parts of 1-sulfo-6-carboxy-2-aminonaphthalene are diazotized in a customary manner in hydrochloric acid and coupled with 15 parts of 3-acetylaminoaniline at a pH of between 4.0 and 4.5, first at 0° C. and then at 25° to 30° C. The resulting azo compound is then reacted with 19 parts of finely dispersed cyanuric chloride in an aqueous medium at a pH of 4.5 and a temperature of 40° C. The resulting azo compound according to the invention is salted out from the synthesis solution using sodium chloride and isolated. This gives the sodium salt of the compound of the formula

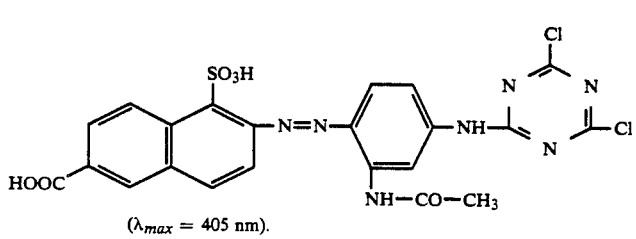

($\lambda_{max}$ = 405 nm).

It has very good fiber-reactive dye properties and, when used in the conventional processes for example on cotton, gives dyeings and prints in strong, fast, reddish yellow hues.

EXAMPLE 11

18.4 parts of cyanuric chloride are reacted with 31.9 parts of 1-amino-3,6-disulfo-8-naphthol in water in a known manner to give the monocondensation product which is subsequently treated with an equivalent amount of a solution of the diazonium salt of 1-sulfo-6-carboxy-2-aminonaphthalene; the coupling reaction is carried out at a pH of between 4.0 and 4.5.

The azo compound according to the invention is isolated in a customary manner. Written in the form of the free acid, it has the formula

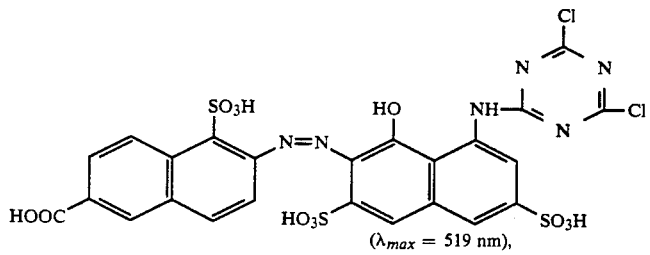

($\lambda_{max}$ = 519 nm), has very good fiber-reactive dye properties and, when the customary application and fixing method are used, gives, on the materials mentioned in the description such as, for example, cotton, bright red dyeings and prints which have good fastness properties and a high brilliancy.

EXAMPLE 12

31.9 parts of 1-amino-8-naphthol-3,6-disulfonic acid are reacted with 19 parts of difluorochloropyrimidine in a customary manner. An equivalent amount of the diazonium salt of 1-sulfo-6-carboxy-2-aminonaphthalene is then added, and the coupling reaction is carried out at a pH of from 4.0 to 4.5. The resulting azo compound according to the invention which, in the form of the free acid, has the formula

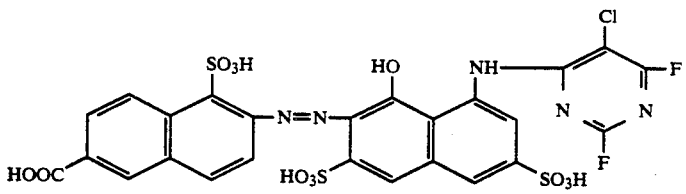

is isolated in a customary manner, for example by salting out. It has very good fiber-reactive dye properties and, following the application and fixing processes customary in fiber-reactive dye technology, gives, for example on cotton, strong red dyeings and prints which have good fastness properties.

EXAMPLE 13 TO 35

Further azo compounds according to the invention are described in the tabulated examples below with the aid of the formula (B)

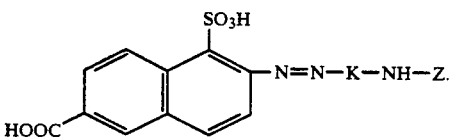

They can be prepared according to the invention, for example analogously to one of the above Exemplary Embodiments 10 to 12, and have very good fiber-reactive dye properties. Using application and fixing processes customary in this technology, they give strong, fast dyeings and prints in the hue given in the respective tabulated example, for example on cotton.

| Example | Radical —K—NH— | Radical Z | Hue |
|---|---|---|---|
| 13 | 3,6-disulfo-8-hydroxynaphth-7-yl-1-amino | 2-fluoro-4,5-dichloro-pyrimidin-6-yl | red |
| 14 | 3,6-disulfo-8-hydroxynaphth-7-yl-1-amino | 2,5-dichloro-4-fluoro-pyrimidin-6-yl | red |
| 15 | 6-sulfo-8-hydroxy-naphth-7-yl-2-amino | 4,6-dichloro-s-triazin-2-yl | orange |
| 16 | 6-sulfo-8-hydroxy-naphth-7-yl-2-amino | 2,4-difluoro-5-chloro-pyrimidin-6-yl | orange |
| 17 | 6-sulfo-8-hydroxy-naphth-7-yl-2-amino | 6-fluoro-4-(4'-sulfo-phenyl)-amino-s-triazin-2-yl | orange |
| 18 | 6-sulfo-8-hydroxynaphth-7-yl-3-amino | 4,6-dichloro-s-triazin-2-yl | scarlet |
| 19 | 6-sulfo-8-hydroxynaphth-7-yl-3-amino | 2,4-difluoro-5-chloro-pyrimidin-6-yl | scarlet |
| 20 | 6-sulfo-8-hydroxynaphth-7-yl-3-amino | 2-fluoro-4,5-dichloro-pyrimidin-6-yl | scarlet |
| 21 | 6-sulfo-8-hydroxynaphth-7-yl-3-amino | 6-fluoro-4-(4'-sulfo-phenyl)-amino-s-triazin-2-yl | scarlet |
| 22 | 3-ureido-phen-4-yl-1-amino | 4,6-dichloro-s-triazin-2-yl | yellow |
| 23 | 3-ureido-phen-4-yl-1-amino | 2,4-difluoro-5-chloro-pyrimidin-6-yl | yellow |
| 24 | 3-ureido-phen-4-yl-1-amino | 6-fluoro-4-(4'-sulfo-phenyl)-amino-s-triazin-2-yl | yellow |
| 25 | 3-acetylamino-phen-4-yl-1-amino | 4,6-dichloro-s-triazin-2-yl | yellow |
| 26 | 3-acetylamino-phen-4-yl-1-amino | 2,4-difluoro-5-chloro-pyrimidin-6-yl | yellow |
| 27 | 3-acetylamino-phen-4-yl-1-amino | 2-fluoro-4,5-dichloro-pyrimidin-6-yl | yellow |
| 28 | 3-acetylamino-phen-4-yl-1-amino | 6-fluoro-4-(4'-sulfo-phenyl)-amino-s-triazin-2-yl | yellow |
| 29 | 3-methyl-5-one-pyrazol-4-yl-1-(phenyl-4'-amino) | 4,6-dichloro-s-triazin-2-yl | yellow |
| 30 | 3-methyl-5-one-pyrazol-4-yl-1-(phenyl-4'-amino) | 2,4-difluoro-5-chloro-pyrimidin-6-yl | yellow |
| 31 | 3-methyl-5-one-pyrazol-4-yl-1-(phenyl-4'-amino) | 6-fluoro-4-(4'-sulfo-phenyl)-amino-s-triazin-2-yl | yellow |
| 32 | 3-carboxy-5-one-pyrazol-4-yl-1-(phenyl-4'-amino) | 4,6-dichloro-s-triazin-2-yl | yellow |
| 33 | 3-carboxy-5-one-pyrazol-4-yl-1-(phenyl-4'-amino) | 2,4-difluoro-5-chloro-pyrimidin-6-yl | yellow |
| 34 | 4-methyl-6-hydroxy-2-one-pyrid-3-yl-1-(ethyl-2'-amino) | 4,6-dichloro-s-triazin-2-yl | yellow |
| 35 | 4-methyl-6-hydroxy-2-one-pyrid-3-yl-1-(ethyl-2'-amino) | 6-fluoro-4-(4'-sulfo-phenyl)-amino-s-triazin-2-yl | yellow |

EXAMPLES 36 TO 43

Further disazo compounds according to the invention which correspond to the formula (C)

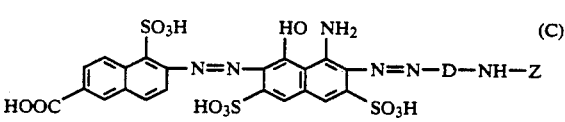

are described in the tabulated examples below with the aid of components D and Z. They can be prepared in a manner according to the invention by using other starting components which can be seen from the respective examples, for example in analogy to Exemplary Embodiment 1. They likewise have very good fiber-reactive dye properties and, if the application and fixing processes are used which are customary for fiber-reactive dyes, give, on the materials mentioned in the description such as, in particular, cellulose fiber materials such as cotton, strong, fast dyeings and prints in the hue given in the particular tabulated example (in this case cotton).

The alternation forms (a) and (b) of the radical D are radicals of the following formulae:

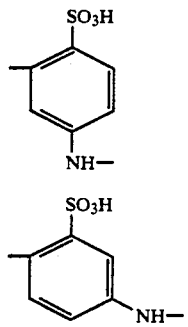

(a)

(b)

Disazo compound of the formula (C)

| Example | Radical D | Radical Z | Hue |
|---|---|---|---|
| 36 | formula (a) | 4,6-dichloro-s-triazin-2-yl | navy |
| 37 | formula (b) | 4,6-dichloro-s-triazin-2-yl | navy |
| 38 | formula (a) | 2,5-dichloro-4-pyrimidin-6-yl | navy |
| 39 | formula (b) | 2,5-dichloro-4-pyrimidin-6-yl | navy |
| 40 | formula (a) | 2-fluoro-4,5-dichloro-pyrimidin-6-yl | navy |
| 41 | formula (b) | 2-fluoro-4,5-dichloro-pyrimidin-6-yl | navy |
| 42 | formula (a) | 2,4-difluoro-5-chloro-pyrimidin-6-yl | navy |
| 43 | formula (b) | 2,4-difluoro-5-chloro-pyrimidin-6-yl | navy |

We claim:
1. An azo compound which corresponds to formula (1)

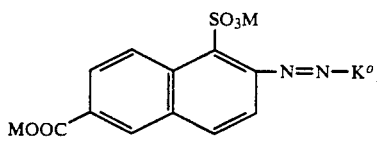 (1)

in which:
M is a hydrogen atom or a salt-forming metal atom;
K° is a radical of the formula (2A) or (2B)

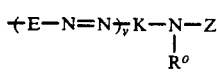 (2A)

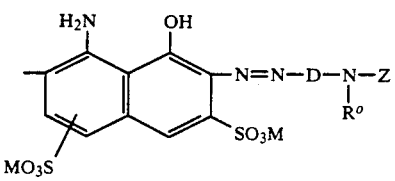 (2B)

in which
M has the aforementioned meaning R° is hydrogen or alkyl having 1 to 4 carbon atoms, or is alkyl which has 1 to 4 carbon atoms and which is substituted by sulfo, carboxyl, sulfato, phosphato, hydroxyl, methoxy, ethoxy, phenyl, monsulfophenyl or disulfophenyl,
Z is a group of the formula (6)

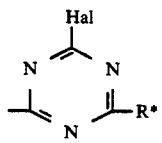 (6)

in which
Hal is a chlorine or fluorine atom, and
R* is a group of the formula (7)

 (7)

in which
$R^7$ is hydrogen, methyl or ethyl and
$R^{10}$ is phenyl substituted by one or two sulfo groups or, when K is a radical of the formula (2B), in which $R^1$ is hydrogen, Z is 2,4-dichloro-s-triazin-6-yl or difluorochloropyrimidinyl,
D is a radical of the formula (3)

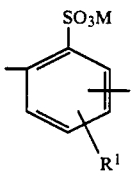 (3)

in which
M has one of the abovementioned meanings and
$R^1$ is hydrogen or alkyl having 1 to 4 carbon atoms,
E is a radical of the formula (4a), (4b), (4c) or (4d)

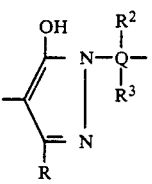 (4a)

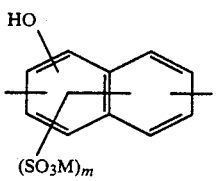 (4b)

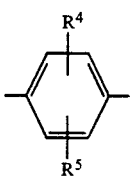 (4c)

-continued

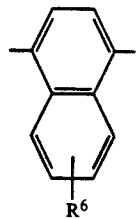 (4d)

in which
R is hydrogen, alkyl having 1 to 4 carbon atoms, cyano, carboxyl, carbalkoxy having 2 to 5 carbon atoms, carbamoyl or phenyl,
Q is a benzene or naphthalene radical,
$R^2$ is hydrogen, alkyl having 1 to 4 carbon atoms, alkoxy having 1 to 4 carbon atoms, fluorine, bromine, chlorine, sulfo, carboxyl, carbalkoxy having 2 to 5 carbon atoms, trifluoromethyl, carbamoyl or N-($C_1$-$C_4$-alkyl)-carbamoyl, if Q is a benzene ring, or
$R^2$ is hydrogen or sulfo, if Q is a naphthalene ring,
$R^3$ is hydrogen, alkyl having 1 to 4 carbon atoms, alkoxy having 1 to 4 carbon atoms, chlorine or sulfo, if Q is a benzene radical, or is hydrogen or sulfo, if Q is a naphthalene radical,
$R^4$ is hydrogen, alkyl having 1 to 4 carbon atoms, alkoxy having 1 to 4 carbon atoms, bromine, chlorine, trifluoromethyl, sulfo, carboxyl or cyano,
$R^5$ is hydrogen, alkyl having 1 to 4 carbon atoms, alkoxy having 1 to 4 carbon atoms, chlorine, amino, alkylamino having 1 to 4 carbon atoms, alkanoylamino having 2 to 5 carbon atoms, benzoylamino, ureido, N'-phenylureido, N'-($C_1$-$C_4$-alkyl)ureido, phenylsulfonyl or alkylsulfonyl having 1 to 4 carbon atoms,
$R^6$ is hydrogen or sulfo,
M has one of the abovementioned meanings,
m is the number 1 or 2,
v is the number zero or 1 and —K—N(R°)— is the bivalent radical of the formula (5a), (5b), (5c), (5d), (5e), (5f), (5g), (5h) or (5i)

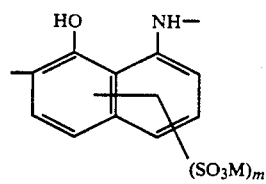 (5a)

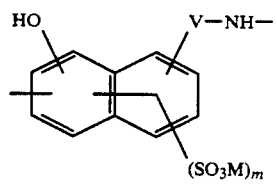 (5b)

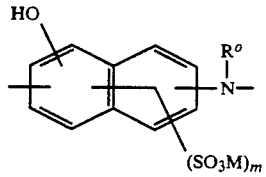 (5c)

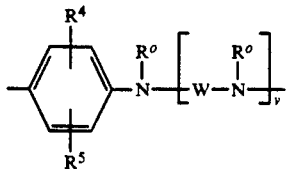 (5d)

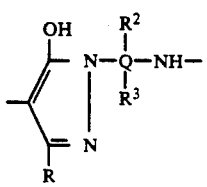 (5e)

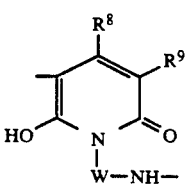 (5f)

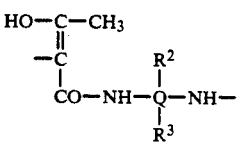 (5g)

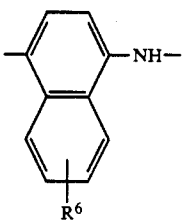 (5h)

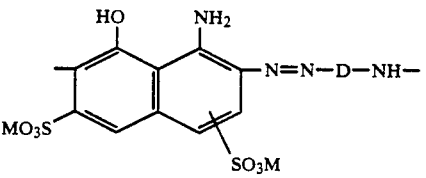 (5i)

in which
M, m, Q, D, R, R°, $R^1$, $R^2$, $R^3$, $R^4$, $R^5$, $R^6$, and v have one of the abovementioned meanings,
V is a direct, covalent bond, or a radical of the formula —NH—CO—phenylene, —NH—CO—NH—phenylene, —N($CH_3$)—CO—phenylene, —N($CH_3$)—CO—NH—phenylene or —NH—phenylene,
W is a phenylene radical which is unsubstituted or substituted by 1 or 2 substituents selected from the group comprising alkyl having 1 to 4 carbon atoms, alkoxy having 1 to 4 carbon atoms, chlorine, carboxyl and sulfo, or is an alkylene having 1 to 6 carbon atoms, or an alkylene phenylene with an alkylene having 2 to 4 carbon atoms,
$R^8$ is hydrogen, alkyl having 1 to 4 carbon atoms, alkoxy having 1 to 4 carbon atoms, phenyl, or alkyl which has 1 to 4 carbon atoms, and is substituted by cyano, and
$R^9$ is hydrogen, sulfo, sulfoalkyl having 1 to 4 carbon atoms, cyano or carbamoyl.

2. An azo compound as claimed in claim 1, which corresponds to the formula (1) in which K° is a radical of the formula (2B), in which R¹ is hydrogen and Z is 2,4-dichloro-s-triazin-6-yl or difluorochloropyrimidinyl.

3. An azo compound, of the formula

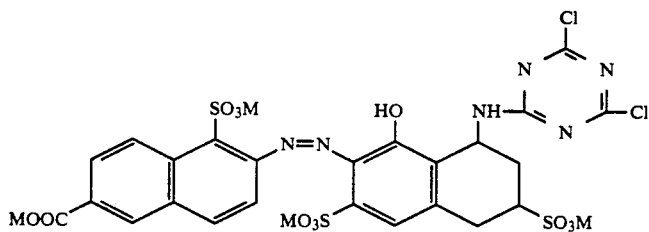

where M is a hydrogen atom or a salt-forming metal atom.

4. An azo compound, which corresponds to the formula

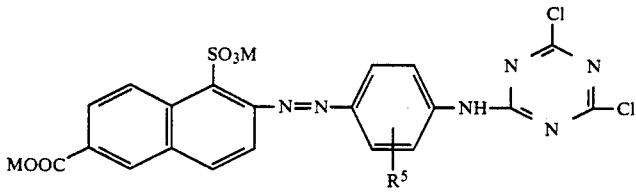

in which M is a hydrogen atom or a salt-forming metal atom and $R^5$ is methyl, ureido or acetylamino.

5. An azo compound of the formula

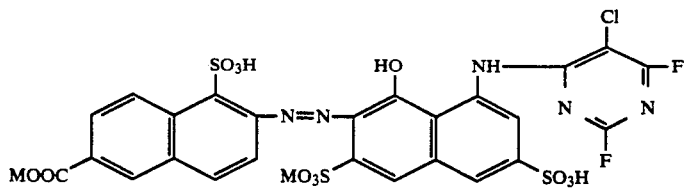

where M is a hydrogen atom or a salt-forming metal atom.

6. An azo compound as claimed in claim 5, wherein M is hydrogen or an alkali metal atom.

7. An azo compound as claimed in claim 1, wherein M is hydrogen or an alkali metal atom.

8. An azo compound as claimed in claim 1, wherein R° is hydrogen, methyl or ethyl.

* * * * *

UNITED STATES PATENT AND TRADEMARK OFFICE
CERTIFICATE OF CORRECTION

PATENT NO. : 5,268,458
DATED : December 7, 1993
INVENTOR(S) : Hartmut Springer and Kurt Hussong It is certified that error appears in the above-indentified patent and that said Letters Patent is hereby corrected as shown below:

In column 6, line 45, "(9)" should read --(9f)--.

In column 10, line 37, "4',-aminophenyl" should read --4'-aminophenyl--.

In claim 3, at column 23, line 20, the formula should read:

--

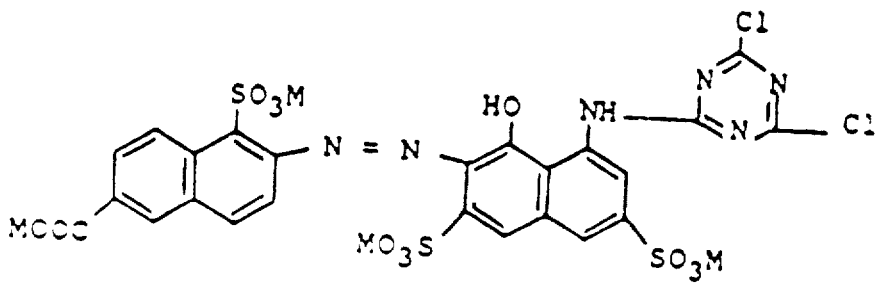

--.

UNITED STATES PATENT AND TRADEMARK OFFICE
CERTIFICATE OF CORRECTION

PATENT NO. : 5,268,458

DATED : December 7, 1993

INVENTOR(S) : Hartmut Springer and Kurt Hussong

It is certified that error appears in the above-indentified patent and that said Letters Patent is hereby corrected as shown below:

In claim 5, at column 24, line 10, the formula should read:

--

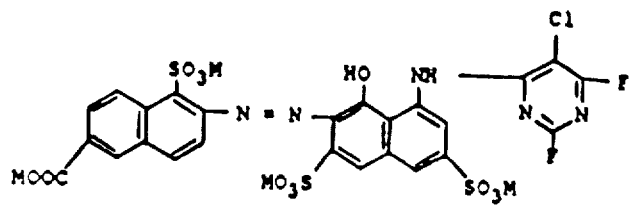

--.

Signed and Sealed this

Twenty-first Day of June, 1994

Attest:

BRUCE LEHMAN

Attesting Officer    Commissioner of Patents and Trademarks